No. 632,244. Patented Sept. 5, 1899.
H. C. COOPER.
MOLDING MACHINE SAND RESERVOIR.
(Application filed May 31, 1899.)
(No Model.) 2 Sheets—Sheet 1.
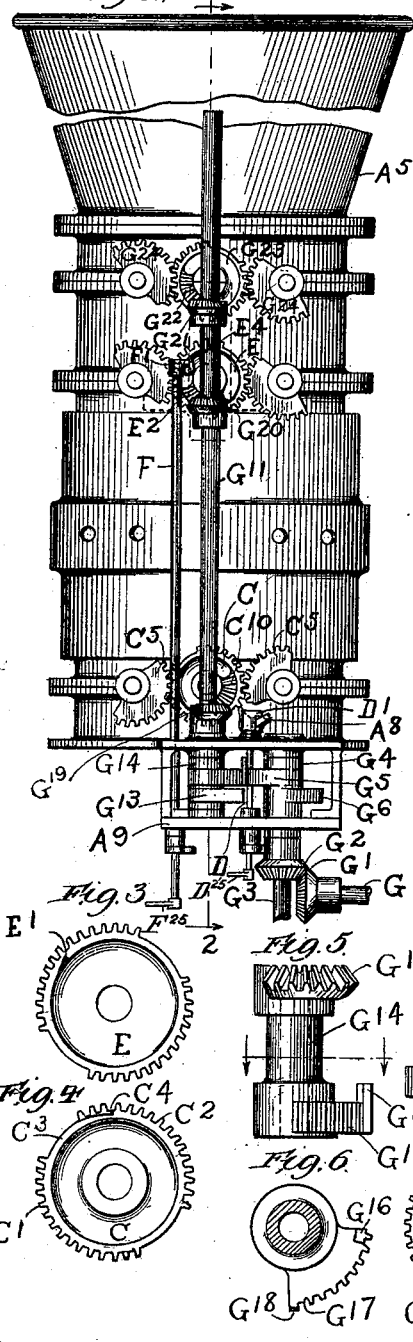
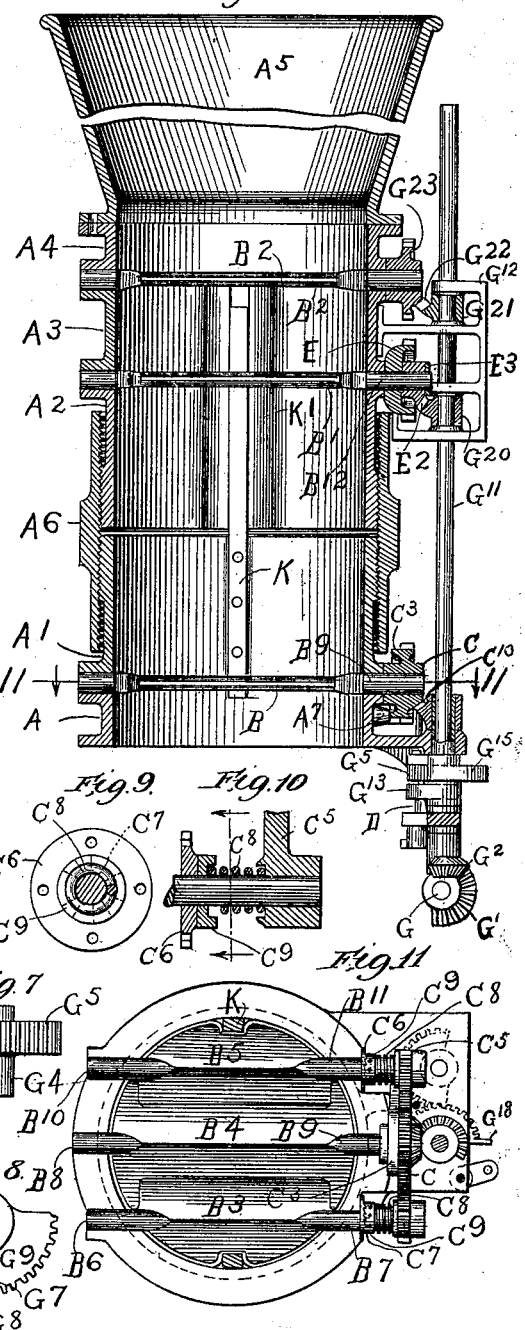
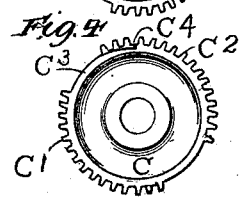
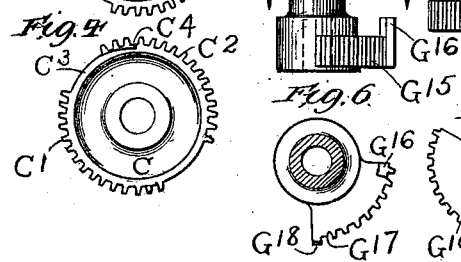
WITNESSES.
INVENTOR
Harry C. Cooper
By Walter H. Chamberlin
ATTORNEY.
THE NORRIS PETERS CO., PHOTO-LITHO., WASHINGTON, D. C.

No. 632,244. Patented Sept. 5, 1899.
H. C. COOPER.
MOLDING MACHINE SAND RESERVOIR.
(Application filed May 31, 1899.)

(No Model.) 2 Sheets—Sheet 2.

WITNESSES.

INVENTOR
Harry C. Cooper
By
Walter H. Chamberlin
ATTORNEY.

UNITED STATES PATENT OFFICE.

HARRY C. COOPER, OF CHICAGO, ILLINOIS.

MOLDING-MACHINE SAND-RESERVOIR.

SPECIFICATION forming part of Letters Patent No. 632,244, dated September 5, 1899.

Original application filed December 19, 1898, Serial No. 699,720. Divided and this application filed May 31, 1899. Serial No. 718,865. (No model.)

*To all whom it may concern:*

Be it known that I, HARRY C. COOPER, a citizen of the United States, residing at Chicago, county of Cook, State of Illinois, have invented a certain new and useful Improvement in Molding-Machine Sand-Reservoirs; and I declare the following to be a full, clear, and exact description of the invention, such as will enable others skilled in the art to which it pertains to make and use the same, reference being had to the accompanying drawings, which form a part of this specification.

My invention has for its object the production of a reservoir and accompanying mechanism for use more particularly as a sand-reservoir in connection with the molding-machine shown and described in my concurrently-pending application filed December 19, 1898, Serial No. 699,720, of which this application is a division.

While the apparatus herein described is adapted more particularly for the machine set forth in my prior application, yet its use need not be necessarily limited thereto, but it might be used in any connection where it is applicable.

It consists in the combination of devices and appliances hereinafter described and claimed.

Figure 12:
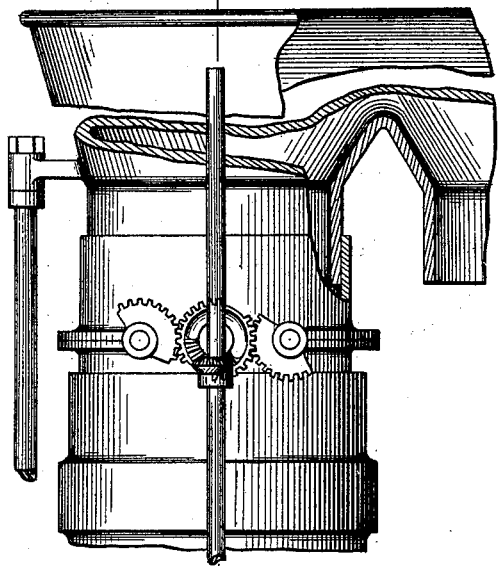
Figure 13:
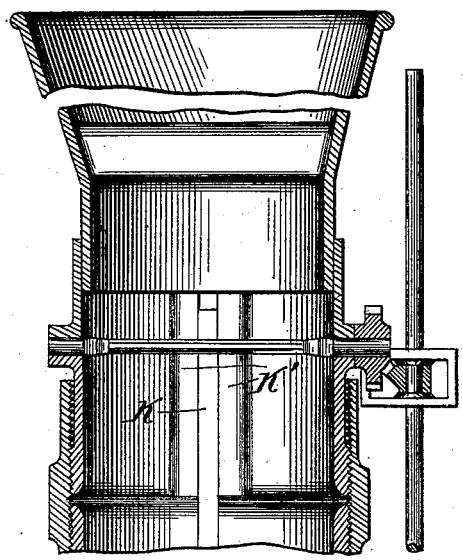

In the drawings, Figure 1 is an elevation of my apparatus. Fig. 2 is a vertical section on the line 2 2 of Fig. 1. Figs. 3 to 10 are details of the parts. Fig. 11 is a cross-section on the line 11 11 of Fig. 2. Fig. 12 is a side elevation, with parts broken away, of a variation. Fig. 13 is a vertical section on the line 13 13 of Fig. 12. Figs. 14 to 19 are diagrammatic views illustrating the operation.

I will first describe a reservoir adapted to discharge two lots of sand one after the other.

A A' A² A³ A⁴ represent a series of frames, preferably, although not necessarily, cylindrical in shape mounted one above the other and suitably engaged together to form a vertical reservoir. Above the section A⁴ is a funnel-shaped section A⁵, constituting the top of the reservoir. The adjoining ends of the sections A A' are flanged to permit them to be engaged together. The adjoining ends of the sections A² A³ and A³ A⁴ and A⁴ A⁵ are also flanged to permit them to be engaged together. The adjoining ends of the sections A' A² are threaded on their exterior and united by the right and left threaded ring or section A⁶, so that the length of that portion of the reservoir formed by the sections A' A² may be increased or decreased. Engaged to the interior of the section A' by bolts or otherwise is a strip K, working in the guides K' on the interior face of the section A², so that the sections cannot revolve with respect to each other.

Between the sections A A', A² A³, and A³ A⁴ are sets of doors or valves B B' B². (Shown in plan in Fig. 11.) Each set is composed of three doors B³ B⁴ B⁵. The door B³ is provided with trunnions B⁶ B⁷ on its end, the door B⁴ with trunnions B⁸ B⁹, and the door B⁵ with trunnions B¹⁰ B¹¹. The three sets of doors are substantially duplicates of each other, with the exception of the mechanism for operating them.

In the use to which I have put the herein-described mechanism in my former application it is necessary to first open the lower set of doors and allow the sand below the doors B' to drop downward or be discharged, subsequently to open the doors B' and allow the sand below the doors B² to be discharged, then to close the doors B and open the doors B² and allow the reservoir to fill from above, and then to close both the doors B' and B². I will take up the description of the mechanisms and their operation in the above order.

Engaged to the trunnion B⁹ is a gear C, toothed on two opposite portions of its periphery, as at C' C², the said teeth extending only across a portion of the periphery, the balance being smooth, as at C³, and this smooth portion is provided with a notch C⁴. On each trunnion B⁷ B¹¹ is a segment-gear C⁵, meshing with the teeth C' C² on the gear C, so that a revolution of the latter revolves all three doors of the set. Surrounding each trunnion B⁷ B¹¹ is a collar C⁶, having its face toothed, as at C⁷. These collars are fixed to the casing. Surrounding each trunnion B⁷ B¹¹ is a spring C⁸, one end engaged to the pinion C⁵, while the other end is engaged to the ratchet-ring C⁹, the latter having its face adjacent to the collar $C^6$ toothed to correspond with the face of the latter, so that when the pinion $C^5$ is revolved it does so against the pressure of the spring $C^8$ and compresses the latter. The tension of the spring can of course be regulated by the ratchet-ring $C^9$. The springs are for the purpose of tilting the doors to dump the sand when the door is released, (by mechanism which I will presently describe,) inasmuch as the construction of the doors is such that the doors are balanced when the weight of the sand is on them. Extending from the frame A is a projection $A^7$, and pivoted thereon is a spring-catch $A^8$, adapted to engage in the notch $C^4$ in the periphery of the gear C to normally hold the door closed against the spring-pressure of the springs $C^8$.

D is a rod extending up from any suitable point, having on its upper end an arm or projection D', which is located just above the tail of the spring-catch $A^8$, so that when the rod D is revolved it will tilt the catch out from the notch and allow the doors to open. The mechanism for revolving the rod D to release the catch is immaterial in this case, since the catch can be tilted in any desirable manner.

The next step in the mechanism is to open the doors B'. On the trunnions $B^{12}$ of the middle set of doors is fixed a dish-shaped gear E, provided on the inner face of its periphery with a notch E', Fig. 3. Revolving loosely on the trunnion $B^{12}$ is a beveled gear $E^2$, held on the trunnion by the collar $E^3$. Carried by this beveled gear is a spring-catch $E^4$, adapted to engage in the notch E', and thus hold the doors closed against the spring-pressure of the springs $C^8$.

F is a rod extending up from any suitable point, having on its upper end an arm or projection F', which is located adjacent to the catch $E^4$, so that when the rod F is revolved it will tilt the catch out from the notch and allow the doors to open. The mechanism for revolving the rod F to release the catch is immaterial in this case, since the catch can be tilted in any desirable manner.

The next step is to close the set of doors B and open the set of doors $B^2$ to fill the reservoirs. This is accomplished as follows: On a shaft G, revolved from any suitable source of power, is a beveled gear G', which meshes with the beveled gear $G^2$ on a vertical shaft $G^3$. Keyed to the shaft $G^3$ is what I will term a "double" segment $G^4$. It is shown in detail in Figs. 7 and 8 and is provided with two-part segments $G^5$ $G^6$ out of alinement with each other. Pivoted on the segment $G^5$ is a catch or pivoted tooth $G^7$, one end, $G^8$, projecting out and being in line with the teeth of the segment $G^5$, while the other end, $G^9$, bears against the shoulder on the hub of the segment, where a spring $G^{10}$ holds it normally, but allows the end $G^8$ to tilt out of alinement with the teeth $G^5$ against the spring-pressure. The shaft $G^3$ is journaled in the frame $A^9$, depending from the casing or frame A. $G^{11}$ is another shaft, the upper end journaled in the frame $G^{12}$, extending from the main casing of the reservoir, and the lower end journaled in the frame $A^9$. Keyed to the lower end of the shaft $G^{11}$ is a segment $G^{13}$, adapted to mesh with the segment $G^6$ on the gear $G^4$. Surrounding the shaft $G^{11}$ above the segment $G^{13}$ is a sleeve $G^{14}$, provided with a segment $G^{15}$, the latter having a projection $G^{16}$. The end of the segment has one or two of its teeth cut away, as at $G^{17}$, and the tooth $G^{18}$ on the end is projected slightly beyond the plane of the other teeth, as shown in Fig. 6, for a purpose which I will later explain. Engaged to the sleeve $G^{14}$ is a beveled gear $G^{19}$, and on the face of the gear C is a beveled segment $C^{10}$, adapted to mesh with the beveled segment $G^{19}$, so that a revolution of the sleeve $G^{14}$ will revolve the gear C, and, as previously described, the movement of the gear C opens or closes the doors B, as the case may be. Engaged to the shaft $G^{11}$ by a feathered engagement is a beveled gear $G^{20}$, the engagement being feathered to permit the gear $G^{20}$ to move vertically on the shaft when the length of the reservoir is adjusted, as previously described, and yet insure a revolution of the gear $G^{20}$ with the shaft. This gear meshes with the beveled segment $E^2$ previously described. Engaged to the shaft $G^{11}$ is another beveled gear $G^{21}$, this engagement also being feathered for the same reason as in the case of the gear $G^{20}$. It meshes with the beveled segment $G^{22}$ on the gear $G^{23}$. The latter is keyed to the trunnion of the middle door, and the side doors are operated through the segments $G^{24}$ on the trunnions of the side doors, the operation in this respect being substantially the same as the other two sets of doors. Now, as will be seen, the revolution of the shaft G revolves the shaft $G^3$, and the latter revolves the segment $G^4$.

Figure 14:
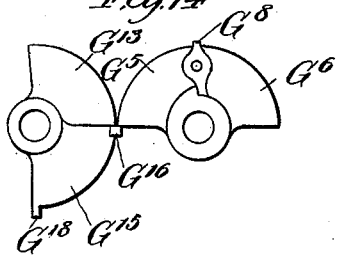
Figure 15:
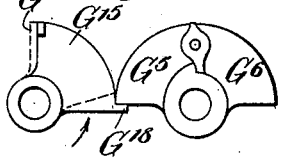
Figure 16:
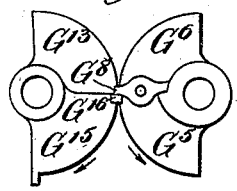
Figure 17:
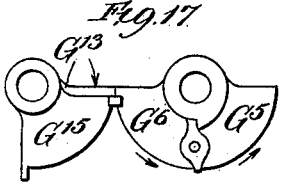
Figure 18:
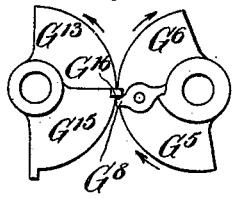
Figure 19:
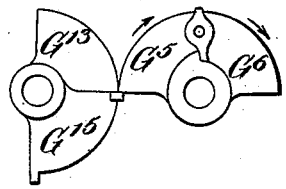

In order that the operation of the sand-doors will be clearly understood, I have provided a series of diagrammatic views, (shown in Figs. 14 and 19, inclusive,) illustrating the various positions of the segments during the various operations of opening and closing the doors, and I wish to call attention at this point to the fact that where one segment—as, for instance, $G^{13}$—is directly beneath a segment $G^{15}$, I have thrown them slightly out of alinement when viewed in plan, so that they may both be seen. Referring now to Fig. 14, the various segments are in the position which they would occupy with all the doors closed. Through the operation of opening the lower sand-doors, as previously described, the beveled gear C revolves, and this revolves the beveled gear $G^{19}$ on the sleeve $G^{14}$, and the segment $G^{15}$ is thereby thrown to the position shown in Fig. 15, the other segment of course remaining unmoved. The relative position between the segments $G^{15}$ and $G^5$ is such that the teeth on $G^{15}$ will not engage with $G^5$ when but one of the segments is moved—as, for instance, in the movement just described. At the tail end of the movement of the segment $G^{15}$ the cut-away portion $G^{17}$ comes opposite to the end of the segment $G^5$, with the projection $G^{18}$ against $G^5$. The shaft $G^3$ is now revolved, carrying with it the segments $G^5$ $G^6$. The initial movement of the segment $G^5$, bearing against the tooth $G^{18}$, starts the segment $G^{15}$, and this causes the teeth $G^5$ to engage with the teeth $G^{15}$ and revolve the latter to the position shown in Fig. 16. This of course revolves the lower sand-doors and closes them. Now a continued revolution of the shaft $G^3$ brings the tooth $G^8$ on the catch $G^7$ against the projection $G^{16}$ on the segment $G^{15}$ and kicks the latter out of the way, so that its teeth will not engage with $G^5$ on the return movement. The initial quarter-turn of the shaft $G^3$ just described has meantime brought the segment $G^6$ around to the point where its teeth will engage with the segment $G^{13}$, as shown in Fig. 16. A continued movement of the shaft $G^3$, or the second quarter-turn thereof, revolves the segment $G^{13}$ to the position shown in Fig. 17. This revolves the shaft $G^{11}$. At this point I will digress to call attention to the fact that, as previously explained, when the middle doors B' were open the catch $E^4$, which was on the beveled segment $E^2$, was disengaged from the notch E' in the gear E, thus allowing the gear E when the doors opened to revolve a quarter-turn. Now as the second quarter-turn of the shaft $G^3$, as illustrated in Fig. 17, gives the shaft $G^{11}$ the quarter-turn just described, and this brings the catch $E^4$ around to the notch E' and permits it to engage in said notch. This same quarter-turn of the shaft $G^{11}$ just described acts through the gear $G^{21}$, meshing with the beveled gear $G^{22}$ on the gear $G^{23}$, to open the upper sand-doors $B^2$. It will thus be seen that by the half-turn of the shaft $G^3$ (and this is its maximum movement) we have closed the lower sand-doors, permitted the middle sand-doors to remain open, (but engaged them so that the return movement will close them,) and opened the upper sand-doors. This of course will allow the sand in the hopper above the upper sand-doors to drop down and fill both reservoirs. Now on the reverse movement of the shaft $G^3$ the segment $G^6$, which has of course remained in mesh with the segment $G^{13}$, will throw the segment $G^{13}$ to the position shown in Fig. 18, thus of course giving the shaft $G^{11}$ a quarter-turn and operating through the catch $E^4$ engaging in the notch E' to close the middle sand-doors and of course close the upper sand-doors, the movement being simply the reversal of that in opening them. This same quarter-turn of the shaft $G^3$ to the position shown in Fig. 18, but the segment $G^5$ will not disturb the segment $G^{15}$, for the reason that the pivoted catch $G^7$, when the tooth $G^8$ strikes the projection $G^{16}$, tilts against the spring-pressure $G^{10}$ and permits the segment $G^5$ on the last quarter-turn of the reverse movement to slip past the segment $G^{15}$ without engaging it. This brings us to the position shown in Fig. 19, which is the initial position with all the doors closed and corresponds with Fig. 14.

It will be seen from the above that by the movement of the tripping-rods D F and by the revolution of the shaft $G^3$, I control the discharge of two different lots of sand at different times and the filling of the reservoir.

It sometimes happens that in connection with molding-machines but a single lot of sand is required. In that case the middle set of doors is dispensed with, as shown in Figs. 12 and 13, and only the lower and upper sets of doors are provided.

What I claim is—

1. The combination with a measuring-receptacle, of a supplementary measuring-receptacle and mechanism for discharging the contents of the latter through the former, substantially as described.

2. The combination of a main measuring-receptacle, a supplementary measuring-receptacle communicating with the first one or more doors or valves governing the discharge from the main receptacle, one or more doors or valves governing the communication between the two receptacles, and one or more doors or valves governing the admission to the supplementary receptacle, and means for operating each set of doors or valves independent of the others, substantially as described.

3. The combination of a main measuring-receptacle, a supplementary measuring-receptacle communicating with the first, one or more doors or valves governing the discharge from the main receptacle, one or more doors or valves governing the communication between the two receptacles, and one or more doors or valves governing the admission to the supplementary receptacle, means for opening successively the discharge-doors for the two receptacles and means for subsequently closing the discharge set for the main receptacle subsequently opening the admission set for the supplementary receptacle, and subsequently closing all the doors, substantially as described.

4. A reservoir provided in its bottom with one or more doors or valves through which the contents are discharged, another reservoir mounted above the first and separated therefrom by one or more doors or valves through which the contents of the second reservoir are discharged and one or more doors or valves above the second reservoirs for governing the admission into the reservoir and means for directing the material to the latter doors, substantially as described.

5. A reservoir provided with one or more doors or valves through which the contents are discharged, catch mechanism for holding said doors or valves closed, another reservoir mounted above the first and separated therefrom by one or more doors or valves, said latter doors or valves held closed by catch mechanism; mechanism for releasing the lower set of doors, mechanism for releasing the second set of doors and one or more doors or valves controlling the inlet to the upper or second reservoir with positively-driven mechanism for opening and closing said upper doors, substantially as described.

6. A sand-reservoir provided with one or more doors or valves through which the contents are discharged, said doors or valves connected with a revolving shaft, a gear on said shaft, a catch for engaging said gear to prevent its revolution and thus allow the doors to open, means for releasing the catch and a gear connected with the gear on said shaft and mechanism for revolving the first-named gear to close the doors, substantially as described.

7. A reservoir comprising the following mechanism: a shaft $G^3$ and mechanism for revolving same; a double segment $G^4$; a sleeve $G^{14}$ carrying a segment $G^{15}$; a shaft $G^{11}$ carrying a segment $G^{13}$; a beveled gear $G^{19}$ on the sleeve $G^{14}$; a gear $C$ meshing with the gear $G^{19}$, said gear $C$ mounted on the trunnion of the door $B^4$; a gear $G^{20}$ on the shaft $G^{11}$ meshing with the gear $E^2$ loose on the trunnion $B^{12}$ a gear $E$ fixed to the trunnion $B^{12}$ a pawl on the gear $E^2$ to engage the gear $E$ and a pawl on the stationary part to engage the gear $C$, substantially as described.

8. Two reservoirs one mounted above the other, the lower reservoir provided with one or more doors or valves through which the contents are discharged, one or more doors or valves between the two reservoirs, one or more doors or valves above the upper reservoir and mechanism for closing the lowest doors and subsequently opening the upper doors by the same movement of said mechanism, substantially as described.

9. Two reservoirs one mounted above the other, the lower reservoir provided with one or more doors or valves, governing the discharge from the same, one or more doors or valves between the two reservoirs, one or more doors or valves above the two reservoirs to govern the admission thereto, a revolving shaft arranged to first close the lower set of doors and subsequently in the same revolution to open the upper set of doors and mechanism connected with the shaft whereby on a revolution of the same in the opposite direction the middle and upper set of doors are closed, substantially as described.

10. A reservoir provided with one or more doors or valves through which the contents are discharged and one or more doors or valves governing the admission to the reservoir, catch mechanism for holding the discharge-doors normally closed, an operating-shaft and connections between the shaft and each set of doors whereby a revolution of the shaft in one direction operates to close the lower set of doors and open the upper set and a revolution of the shaft in the opposite direction operates to close the upper set without affecting the lower set, substantially as described.

11. A reservoir provided with one or more doors or valves through which the contents are discharged, catch mechanism for holding said doors or valves normally closed, mechanism to release the doors and one or more doors or valves controlling the inlet to said reservoir, a shaft and connections for opening and closing the inlet-doors and connections between the shaft and the discharge-doors whereby the latter are closed by the shaft before the inlet-doors are opened, the catch mechanism or the discharge-doors being independent of the door-actuating mechanism, substantially as described.

12. A reservoir comprising the following mechanism: a shaft $G^3$ and mechanism for revolving the same; a double segment $G^4$; a sleeve $G^{14}$ carrying a segment $G^{15}$; a shaft $G^{11}$ carrying a segment $G^{13}$; a beveled gear $G^{19}$ on the sleeve $G^{14}$ and a gear $C$ meshing with the gear $G^{19}$, said gear mounted on the trunnion of the door $B^4$, substantially as described.

13. A reservoir provided with one or more discharge doors or valves, one or more inlet doors or valves; a shaft $G^3$ and mechanism for revolving same; a double segment $G^4$; a sleeve $G^{14}$ carrying a segment $G^{15}$; a shaft $G^{11}$ carrying a segment $G^{13}$; a beveled gear $G^{19}$ on the segment $G^4$; a gear $C$ meshing with the gear $G^{19}$, said gear $C$ connected with the discharge door or doors and connections between the shaft $G^{11}$ and the inlet door or doors, substantially as described.

14. A measuring-receptacle provided with one or more inlet or admission doors or valves, and one or more discharge doors or valves, means for opening the discharge set, and means for subsequently closing the discharge set and opening the inlet set and then closing the inlet set, said means for opening the discharge set being independent of the balance of the actuating means, substantially as described.

In testimony whereof I sign this specification in the presence of two witnesses.

HARRY C. COOPER.

Witnesses:
GERTRUDE HEIDELBERGER,
LUTE S. ALTER.